May 28, 1957     D. SCHMITT     2,793,514

AUTOMATICALLY ADJUSTABLE COUPLING

Filed Aug. 26, 1953

United States Patent Office 2,793,514
Patented May 28, 1957

2,793,514

AUTOMATICALLY ADJUSTABLE COUPLING

Désiré Schmitt, Eauxbonnes, France, assignor to Societe Anonyme: Ateliers de Construction Lavalette, Saint-Ouen, France, a society of France Application August 26, 1953, Serial No. 376,669

2 Claims. (Cl. 64—25)

The present invention relates to timing regulators for internal combustion engines and more particularly to a timing regulator for the injection or for the ignition in engines of that type.

There exist numerous systems of timing regulators having for their object to modify, either the timing of the injection in engines in which the fuel is injected towards the end of the compression stroke of the motor, or the timing of the ignition in engines in which the fuel is preliminarily vaporized in the intake manifold and is sucked in with the combustion air.

When these timing regulators are utilized with injection pumps, thery are normally mounted between the union of the pump and the pump itself. They transmit the driving torque which they receive from the driving shaft of the motor to the injection pump.

The purpose of the timing regulators is to displace the ignition or the beginning of the injection in function of the speed according to a law ensuring for the motor the best possible efficiency at all stages of its operation.

In order that a timing regulator for an injection pump may function correctly, it must be sensitive to variations of speed, but unaffected by variations in the torque which it transmits. In other words, when the motor rotates with a constant speed, it is necessary that the timing given by the regulator be constant whatever may be the torque which it transmits to the injection pump.

Now, this torque is essentially variable in magnitude and in duration according to the load on the motor. At small rates of flow of the injected fuel, at a given speed of the motor, which is the case of a motor running at no load, the surge of the fuel as it is supplied by the pump takes place normally on the lower portion of the slope of the pump-actuating cam. The average surge speed is therefore relatively small. There results an injection pressure which is relatively small and, consequently, a small torque, necessary for the momentary drive of the pump.

Moreover, the injection angle being small, the driving torque has but a very short duration. The average driving torque of the pump is therefore all the smaller.

If the rate of flow of fuel is large, which is the case of a motor on full load, the surge takes place normally from the lower portion up to the middle portion of the slope of the cam. The final surge speed is therefore decidedly higher than in the case of a small rate of flow. It follows that the final injection pressure is higher. It is the same with the maximum driving torque of the injection pump.

Similarly, the angular duration of the injection may be 3 or 4 times greater than in the case of a motor running at no load, whence an average driving torque of the pump which is decidedly greater.

To sum up, the torque transmitted by the timing regulator from the motor to the pump is the greater as the output of the pump is greater.

In most known timing regulators, the members regulating the timing serve also to transmit the torque of the motor to the injection pump. There results a bad mechanical operation of these members owing to the great tangential forces to be transmitted and to the friction resutling therefrom, but the principal drawback resides in that these members react in function of the torque which they transmit, which is undesirable.

In the present invention, the functions are separated: there is a member varying the timing which transmits directly the torque of the receiving drive to the shaft of the injection pump and one or several other members which regulate the position of the former varying member without being affected by the forces of transmission of the torque.

The timing of the injection depends on the position of the member for the transmission of the torque.

The invention will be better understood by reference to the following description corresponding to the accompanying drawing in which has been represented, as a non-limiting example, a particular embodiment of the timing regulator according to the invention.

Figure 1:
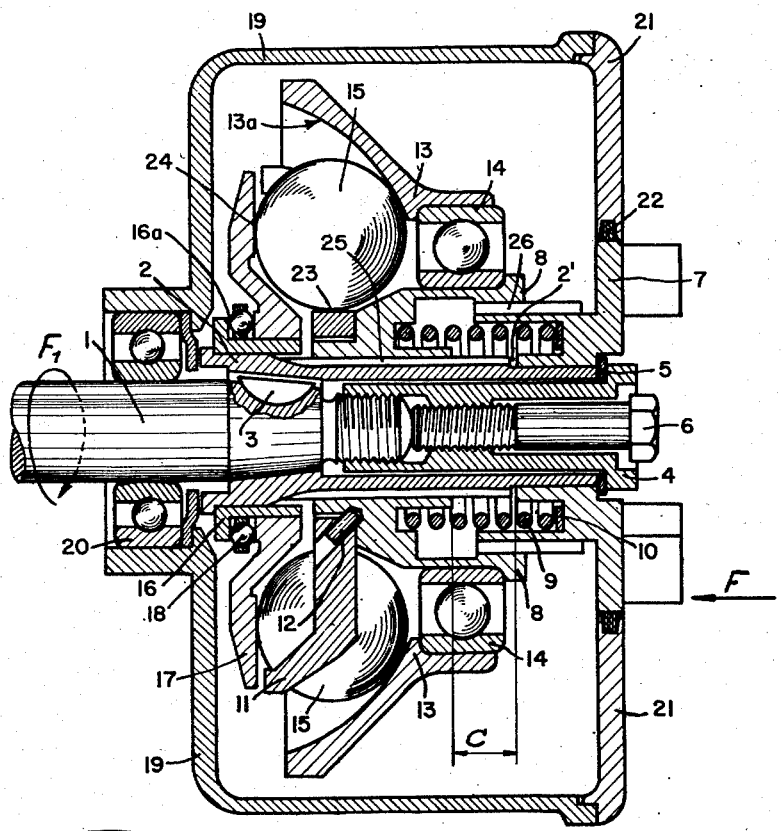
Figure 1 is a sectional view of a coupling illustrating features of the invention.
Figure 2:
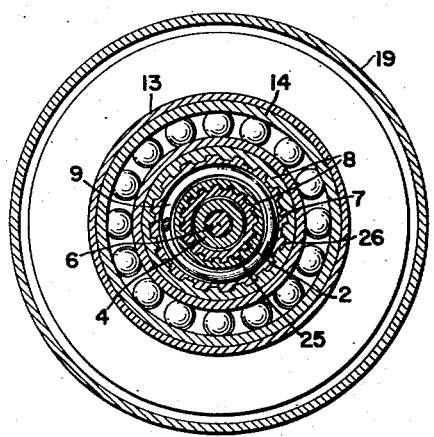
Figure 2 is a further sectional view of the coupling taken on line II—II.

In the figures, on the driven cam shaft 1 of an injection pump (not shown) is keyed a torque receiving sleeve 2, by means of a key 3 and of a hollow screw 4. The latter presses against the sleeve 2 by its head 4', through a washer 5. The hollow screw 4 is stopped by a setscrew 6. A drive coupling member 7 is rotatively mounted on the sleeve 2. It is located axially by the washer 5 and an abutment 2' on the sleeve 2.

The coupling member 7 and the sleeve 2 each are provided with external helicoidal grooves 25 and 26 having a very large pitch. The pitches of these two sets of grooves are in opposite direction to each other. For example, if the pitch of the grooves 25 of the sleeve 2 is left-handed, that of the grooves 26 of the member 7 is right-handed, and reciprocally.

This sleeve 2 and the member 7 are connected to each other by a sleeve 8 which transmits the torque and varies the timing. The sleeve 8 is provided with two sets of internal grooves in opposite direction to each other, adapted to slide respectively on the grooves 25 and 26 of the sleeve 2 and member 7.

Between the sleeve 8 and member 7 is housed a cylindrical spring 9 which presses at one end directly on the sleeve 8 and at the other end on the member 7 by means of an adjusting washer 10. This spring 9 is given a certain initial tension when mounted in its position.

A driving member 11 having faces 23 is screwed on the sleeve 8. A pin 12 fixed in its housing acts as a stop to this driving member.

In addition, the sleeve 8 carries a plate 13 mounted on a ball bearing 14. This plate 13 has an internal shaped surface 13a supporting balls 15, the number of which is variable according to the characteristics to obtain.

On the sleeve 2 is fixed with a force fit a ring 16 which carries a plate 17 mounted rotatively on this ring. This plate 17, which receives the axial thrust of the balls 15, on its face 24, presses on the flange 16a of the ring 16 by means of a thrust ball bearing 18.

The whole of the apparatus is enclosed in a casing 19 which at the same time constitutes a support-bearing for the injection pump. In fact, it carries a ball bearing 20 for the cam shaft 1. A lid 21 of the casing 19 is provided with a seal 22 which ensures the fluid-tightness of the casing 19 on the driving side.

The operation of the device is as follows: the cylindrical spring 9 is mounted with a certain initial tension. It exerts therefore even when at rest a thrust from right to left on the sleeve 8. By means of the ball bearing 14, this sleeve 8 transmits the thrust of the spring 9 to the plate 13. The latter, pressing against the balls 15, pushes them by oblique reaction on the faces 23 of the driving member 11 and on the face 24 of the plate 17.

Supposing that the regulator is driven by the coupling 7, and that the driving speed increases gradually; when this speed reaches a predetermined value, the balls 15 begin to move away radially from their position of rest against the faces 24, for the balls are carried with a rotary motion by the driving member 11, which is itself driven by the sleeve 8 and the coupling 7.

Supposing further that this drive be a clockwise rotation, looking at the regulator in the direction of the arrow F. In this case, in order that the regulator may ensure a positive timing, that is to say in the direction of the clockwise movement, as a function of the speed, the grooves 25 must have a right-handed pitch and the grooves 26 a left-handed pitch.

As a matter of fact, when the balls 15 move radially away from their position of rest, they push the shaped plate 13 from the left to the right by pressing on the plate 17, whose face 24 is plane. The plate 13 transmits its axial motion to the sleeve 8 through the intermediary of the ball bearing 14. The pitch of the grooves 25 being right-handed, the sleeve 8 imparts with respect to itself a rotary motion, according to the arrow $F_1$, to the pump shaft 1, by means of the sleeve 2 keyed on this shaft (it being well understood that the pump shaft 1 is fixed axially). At the same time, the sleeve 8 slides on its external grooves 26 on the coupling member 7. Owing to the fact that these grooves 26 have a left-handed pitch and that the coupling member 7 is in its turn fixed axially, the sleeve 8, while sliding from left to right, receives itself a small rotary motion to the right, according to the arrow $F_1$, with respect to the member 7.

The two relative rotations of the shaft 1 with respect to the sleeve 8 and of the sleeve 8 with respect to the coupling member 7, are added to each other and constitute the variation of the timing.

This variation is nil either when the balls are in their position of rest, that is, when the regulator is stopped or when it rotates with a speed which is at most equal to the "critical speed" of the balls 15, that is, the speed at which they are just on the point of leaving their position of rest.

When the speed has reached a predetermined value, the sleeve 8 will have covered the whole of its possible displacement C. The variation of the timing will be maximum.

The "law of timing," that is to say the angle of relative timing of the pump shaft 1 with respect to the coupling member 7, as a function of the speed, may be obtained at will, according to the shape given to the rolling path of the plate 13 and according to the selected characteristics of the spring 9.

The timing regulator according to the present invention is therefore easily adaptable to any internal combustion engine. This quality is the more valuable as the precise study of the timing as a function of the engine ratings is more and more essential, for the economical working of the engine is connected in great part to the correct variation of the timing as a function of the speed.

Another essential quality of the timing regulator is its irreversibility.

As a matter of fact, the grooves 25 and 26 possess, with respect to the central axes of the parts 2, 8 and 7, inclinations which are less than the angle of friction. Whatever may be therefore the instantaneous torque transmitted by the coupling member 7 to the pump shaft 1 through the intermediary of the sleeves 8 and 2 and of their grooves 26 and 25, these torques cannot cause any axial force on the sleeve 8, for all the axial components of the tangential forces emanating from instantaneous torques are absorbed by the frictions (also instantaneous) between the grooves.

During the injection, the sleeve 8 is therefore locked. No regulation is possible during this period. Now, the period of injection only lasts a few degrees of rotation of the pump shaft 1 (10 to 20 pump degrees for a diesel engine). A relatively long period elapses therefore between two injections where the driving torque of the injecting pump practically falls to zero. It is during these hollow periods that the process of the regulation of the timing takes place.

Another appreciable advantage of the timing regulator resides in the fact that in periods of permanent normal working the balls 15 remain motionless with respect to the parts 11, 13 and 17, which avoids the wear of these parts at the same time as that of the balls.

In fact, supposing that the plate 17, instead of being rotatively movable, is for example fixed to or integral with the casing 19. In this case, the balls 15, pressing against a fixed rolling path, would drive the plate 13 with a speed approximately double that of the shaft 1 and consequently of the driving member 11. Whatever may be the speed of operation, the balls would be possessed of a continuous motion on themselves. There would result a permanent friction of the balls 15 against the branches of the driving member 11 and a rapid wear of these two parts, of the plate 13 and of the ball bearing 14.

The axial ball bearing 18 has for its purpose to allow the plate 17 to assume any angular position with respect to the driving member 11.

Indeed, if the plate 17 were keyed directly on the sleeve 2, it would always offer the same race face to each ball; the wear at the points 24 would be the more rapid.

The relative angular mobility of the plate 17 allows therefore the balls to change their position, in case of acceleration, by "rolling" and not by "sliding" and of taking at any instant an indifferent position.

In permanent normal operation, owing to the centrifugal force exerted by the balls on the plates 17 and 13, the latter rotate with the same speed as all the other movable parts. There results a minimum wear.

What I claim is:

1. In an automatic timing governor, operable for use as an injection timing regulator to govern fuel supply or as an ignition timing regulator to govern spark timing, a driven member, a hub receiving member secured to said driven member, said receiving member having wide pitch helicoidal grooves on the outer rim thereof, the axis of said rim coinciding with the axis of said receiving member, a driving member supported coaxially on said receiving member, said driving member having oppositely disposed wide pitch helicoidal grooves on the outer rim thereof, the axis of said rim coinciding with the axis of said driving member and the longitudinal relative positions of said receiving and driving members remaining unchanged, a slidable sleeve having two inner rims of oppositely disposed wide pitch helicoidal grooves, one of said rims of said grooves of said sleeve being engaged with the grooves of said driving member, the other of said grooves of said sleeve being engaged with the grooves of said receiving member, said driving member and said sleeve being coaxially related to each other, said sleeve being longitudinally slidable along said engaged grooves from one position to another relative to said reeciving and said driving members, and a spring cooperating with said sleeve to return the same to said one position, the pitch of said engaged grooves serving to absorb the axial components of the tangential force emanating from the instantaneous torques transmitted from said driving to said receiving member and when the torque transmitted from said driving to said receiving member is small or non-existent to allow a change in the relative angular position of said members by axial displacement of said slidable sleeve.

2. In an automatic timing governor according to claim 1, a governor having rotatively driven massive balls adapted to move from a position of rest radially outward under the sole action of centrifugal force acting thereon; a ball driving mechanism comprising a curved profile roller track bearingly carried on and connected with said sleeve for rotation relative thereto and for sliding movement therewith, said track having means serving to transform the radial movement of said balls into said longitudinal sliding movement of said sleeve; a roller platform gyrating freely on said receiving member, said platform having a track disposed perpendicularly to the axis of rotation of said driving and receiving members; said spring indirectly influencing the action of said balls by its cooperation with said sleeve to return the balls radially inward to the position of rest when the speed of said sleeve and said sectional track falls below a predetermined rate.

References Cited in the file of this patent

UNITED STATES PATENTS

| | | |
|---|---|---|
| 1,007,097 | Gulick | Oct. 31, 1911 |
| 1,150,694 | Montague | Aug. 17, 1915 |
| 1,807,524 | Goldsborough et al. | May 26, 1931 |
| 2,071,641 | Lunn | Feb. 23, 1937 |
| 2,088,427 | Maurer | July 27, 1937 |
| 2,250,983 | Adler | July 29, 1941 |
| 2,346,359 | Claus | Apr. 11, 1944 |

FOREIGN PATENTS

| | | |
|---|---|---|
| 155,870 | Switzerland | Sept. 16, 1932 |
| 37,369 | Netherlands | Jan. 15, 1936 |